(12) United States Patent
Skudlarek et al.

(10) Patent No.: US 10,289,872 B2
(45) Date of Patent: May 14, 2019

(54) SECURE MECHANISM FOR FINITE PROVISIONING OF AN INTEGRATED CIRCUIT

(71) Applicant: Mentor Graphics Corporation, Wilsonville, OR (US)

(72) Inventors: Joseph P. Skudlarek, Lake Oswego, OR (US); Eugene Kishinevsky, Portland, OR (US); Michael Chen, Happy Valley, OR (US)

(73) Assignee: Mentor Graphics Corporations, Wilsonville, OR (US)

( * ) Notice: Subject to any disclaimer, the term of this patent is extended or adjusted under 35 U.S.C. 154(b) by 269 days.

(21) Appl. No.: 15/152,427

(22) Filed: May 11, 2016

(65) Prior Publication Data

US 2017/0329997 A1    Nov. 16, 2017

(51) Int. Cl.
*G06F 21/73* (2013.01)
*G06F 21/10* (2013.01)

(52) U.S. Cl.
CPC .............. *G06F 21/73* (2013.01); *G06F 21/10* (2013.01)

(58) Field of Classification Search
CPC . G05F 1/66; G05F 1/625; G06F 21/76; G06F 21/71
See application file for complete search history.

(56) References Cited

U.S. PATENT DOCUMENTS

| 8,344,853 | B1* | 1/2013 | Warner | G06K 19/07309 340/10.1 |
| 2015/0379269 | A1* | 12/2015 | Grawrock | G06F 21/57 726/22 |
| 2016/0320785 | A1* | 11/2016 | Kondabathini | G05F 1/66 |

* cited by examiner

*Primary Examiner* — Amir Mehrmanesh
(74) *Attorney, Agent, or Firm* — Mentor Graphics Corporation

(57) ABSTRACT

This application discloses an electronic system including active circuitry configured to be selectively enabled for authorized number of times. The electronic system also includes security circuitry to detect an enablement event associated with the electronic system. The enablement event can correspond to reception of a reset signal associated with the electronic system, a lapse of a predetermined time period, or the like. In response to the detection of the enablement event, the security circuitry can determine a number of times the security circuitry has previously enabled the active circuitry. The security circuitry can generate the enablement signals capable of enabling the active circuitry when the determined number of times the security circuitry has previously enabled the active circuitry is fewer than the authorized number of times.

17 Claims, 9 Drawing Sheets

SECURE MECHANISM FOR FINITE PROVISIONING OF AN INTEGRATED CIRCUIT

TECHNICAL FIELD

This application is generally related to electronic systems and, more specifically, to secured provisioning for an integrated circuit.

BACKGROUND

Circuit developers typically utilize a "design flow" to develop circuit designs representing electronic devices. The particular steps of the design flow often are dependent upon a type of electronic device to be manufactured, its complexity, the design team, and a fabricator or foundry that will manufacture integrated circuits implementing the electronic device. Typically, these circuit developers utilize software and hardware "tools" to help develop and verify the circuit design at various stages of the design flow. The circuit design at the end of the design stage is often specified as a layout design, for example, in a Graphic Database System II (GSDII) format or Open Artwork System Interchange Standard (OASIS) format.

Manufacturing of the integrated circuits based on the layout design can include several different phases, such as wafer fabrication, in-circuit testing, die cutting, wire bonding, device packaging, burn-in testing, device binning, and device marking, which can produce integrated circuit chips implementing the electronic device described in the circuit design. Since many circuit developers utilize third-party fabricators or foundries to manufacture integrated circuit chips, the lack of direct control over the manufacturing of the chips can lead to various manufacturing-related vulnerabilities, such as unauthorized (over)production and/or distribution of chips fabricated based on the layout designs, or the like.

Some circuit developers have attempted to combat these manufacturing-related vulnerabilities by initially locking or disabling manufactured integrated circuit chips, and providing an unlocking code or key to consumers having purchased the manufactured integrated circuit chips. Since part of the manufacturing process tests the integrated circuit chips while they are enabled, such as during the in-circuit testing and the burn-in testing, in order to perform this testing, the circuit developers would have to provide the unlocking code or key to the third-party fabricators or foundries.

SUMMARY

This application discloses provisioning for secured integrated circuits. The secured integrated circuits can be manufactured to include active circuitry and security circuitry. The security circuitry can be configured, for example, through an enrollment process, to enable the active circuitry for an authorized number of times, and disable the active circuitry after the authorized number of enablements has been exhausted. The security circuitry can selectively enable and disable the active circuitry in a system connected online or in a disconnected offline system. In some embodiments, the enrollment process can include receiving an enrollment message, for example, embedded in a test pattern provided to the secured integrated circuits during testing. The security circuitry can extract the enrollment message from the test pattern, for example, de-obfuscating it from the test pattern and/or decrypting the extracted enrollment message.

The security circuitry can analyze the enrollment message to determine whether to initiate the enrollment process. For example, the security circuitry can determine whether the enrollment message was accidentally or intentionally altered after generation. The security circuitry also can limit the enrollment process with the enrollment message depending on its own internal state, for example, when the security circuitry has already been enrolled or has already been enrolled a threshold number of times. During the enrollment process, in some embodiments, the security circuitry can configure its memory system, based on contents of the enrollment message.

The security circuitry can detect an enablement event associated with the electronic system, which can prompt the security circuitry to determine whether to enable or keep enabling the active circuitry. The enablement event can correspond to a reception of a reset signal associated with the secured integrated circuits, a lapse of a predetermined time period, or the like. In response to the detection of the enablement event, the security circuitry can determine a number of times the security circuitry has previously enabled the active circuitry, or if any of the authorized number of times (or enablement rations) remain unutilized. The security circuitry can generate the enablement signals capable of enabling the active circuitry when the determined number of times the security circuitry has previously enabled the active circuitry is fewer than the authorized number of times.

In some embodiments, the security circuitry also can receive a drain message, for example, via a test pattern input to the secured integrated circuits. The security circuitry, in response to the drain message, can re-configure the memory system, which can eliminate the ability of the security circuitry to enable the active circuitry. Embodiments will be described below in greater detail.

DETAILED DESCRIPTION

Illustrative Operating Environment

Figure 1:
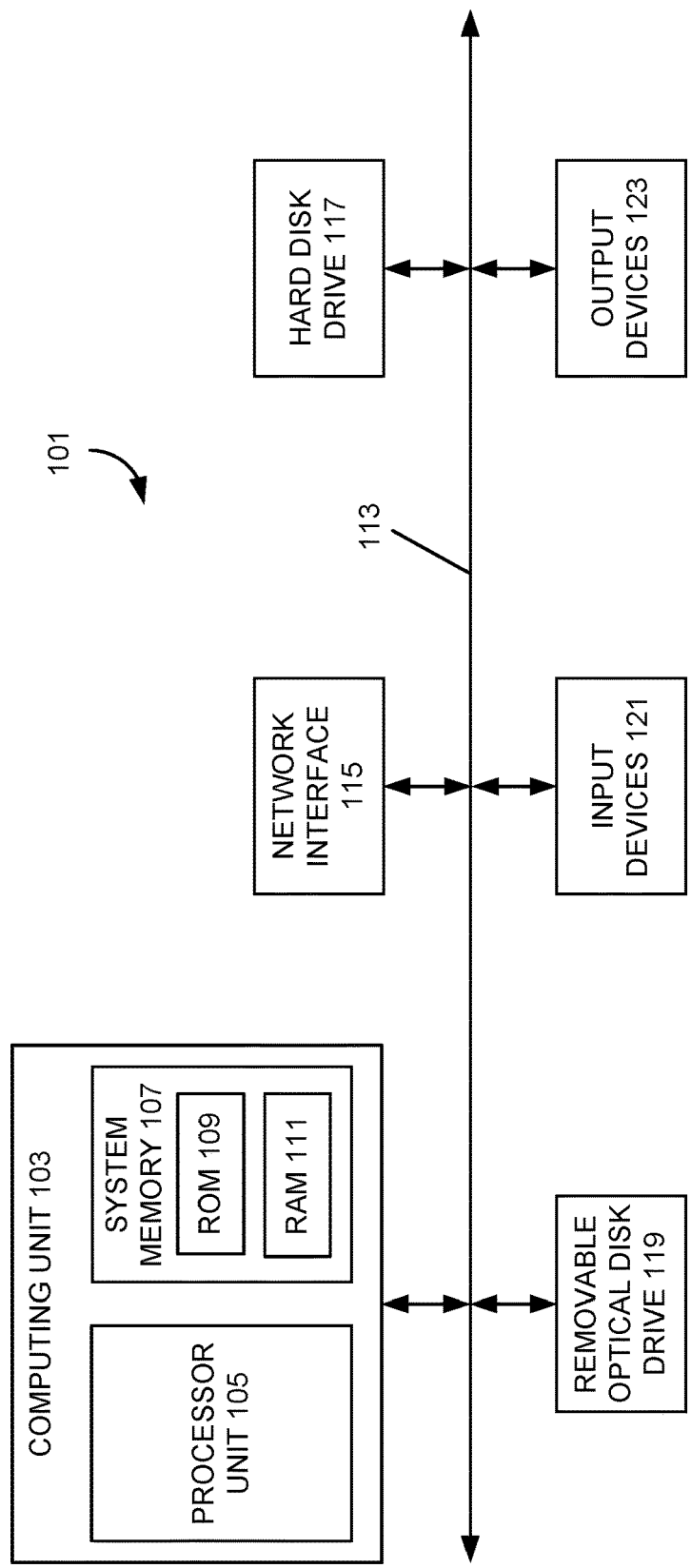
FIGS. 1 and 2 illustrate an example of a computer system of the type that may be used to implement various embodiments of the invention.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
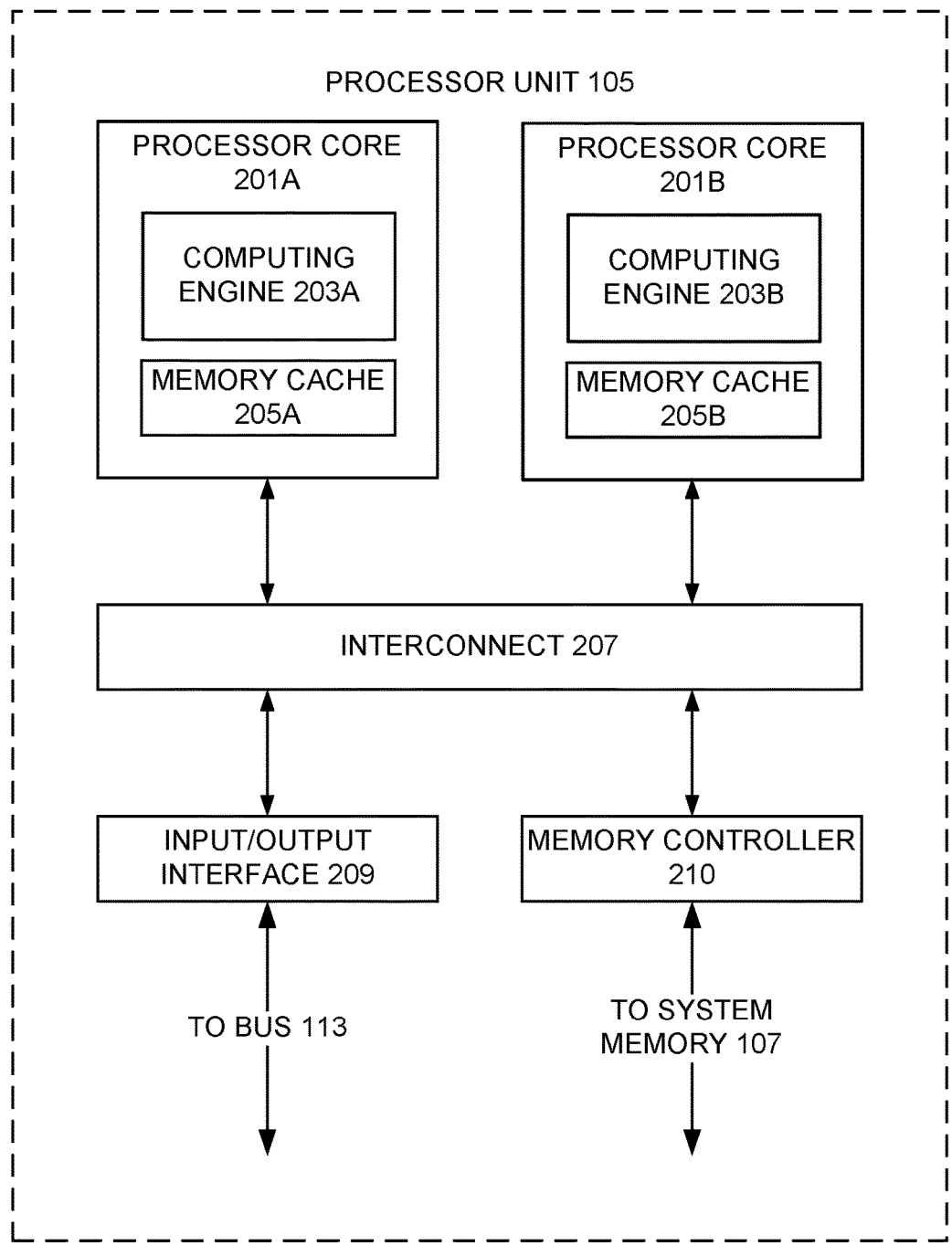

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Secured Provisioning for an Integrated Circuit

Figure 3:
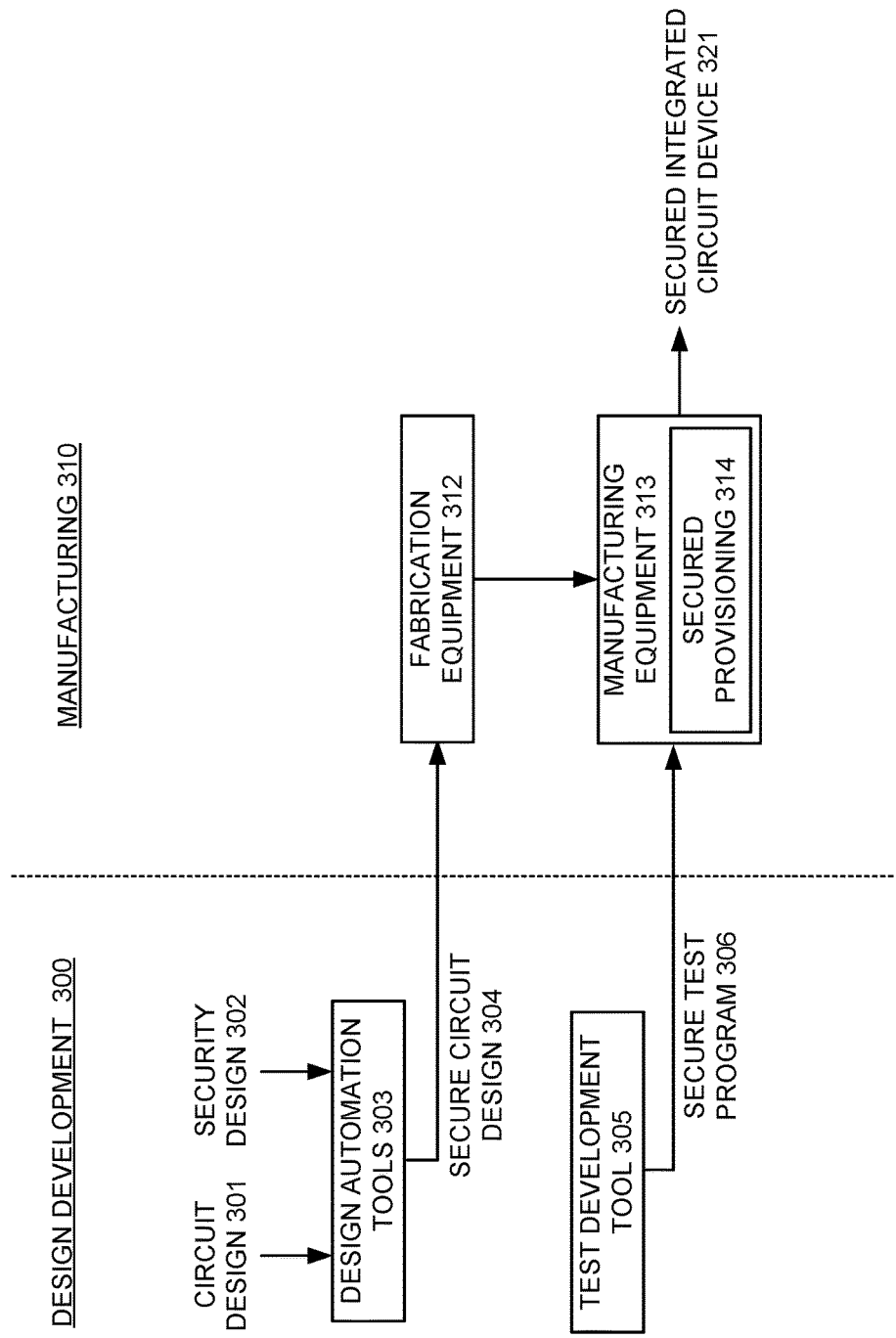
FIG. 3 illustrates an example of a system for design and manufacture of a secured integrated circuit device according to various embodiments of the invention.

FIG. 3 illustrates an example of a system for design and manufacture of a secured integrated circuit device 321 according to various embodiments of the invention. Referring to FIG. 3, in a design development stage 300, circuit developers can utilize a "design flow" to develop a secure circuit design 304 modeling an electronic device. The secure circuit design 304 can be a pattern layout design of the electronic device, for example, in a Graphic Database System II (GSDII) format, Open Artwork System Interchange Standard (OASIS) format, or the like. The circuit developers in the design development stage 300 can utilize one or more design automation tools 303, which can be implemented as described above in FIGS. 1 and 2 or implemented in a hardware deployment, to help develop and verify the secure circuit design 304 at various stages of the design flow.

The one or more design automation tools 303 can receive or internally develop a circuit design 301 describing active circuitry in the electronic device. The one or more design automation tools 303 also can receive or internally develop a security design 302 describing security circuitry capable of locking and/or enabling the active circuitry or portions thereof in the electronic device. The one or more design automation tools 303 can integrate the security design 302 with the circuit design 301, which the one or more design automation tools 303 can transform in the design flow into the secured circuit design 304. In some embodiments, the circuit design 301 and the security design 302 can model their respective circuitry at a register transfer level (RTL), a gate-level, a transistor-level, a layout design, or the like. At the register transfer level, the circuit design 301 and the security design 302 can model circuitry both in terms of an exchange of data signals between components in the electronic device, such as hardware registers, flip-flops, combinational logic, or the like, and in terms of logical operations that can be performed on the data signals in the electronic device, for example, with code in a hardware description language (HDL), such as Verilog, VHSIC (Very high speed integrated circuit) Hardware Design Language (VHDL), SystemC, or the like. At the gate-level, the circuit design 301 and the security design 302 can model circuitry as a network of devices, for example, in a gate-level netlist. At the transistor-level, the circuit design 301 and the security design 302 can model circuitry as a network of transistors, for example, with a Simulation Program with Integrated Circuit Emphasis (SPICE) circuit representation language.

The design development stage 300 also can include one or more test development tools 305, such as an automatic test pattern generation (ATPG) tool, to develop a secure test program 306. In some embodiments, the one or more test development tools 305 can be implemented in a computing environment, for example, as described above in FIGS. 1 and 2. The secure test program 306, when executed by manufacturing equipment 313 in a manufacturing stage 310, can direct manufacturing equipment 313 to input test patterns to an electronic device fabricated in the manufacturing stage 310 and, optionally, to log diagnostic information regarding the response of the electronic device to those test patterns.

The manufacturing stage 310 can include fabrication equipment 312 to fabricate an integrated circuit implementing the electronic device described in the secure circuit design 304. For example, the fabrication equipment 312 can perform various semiconductor processing steps, such as deposition, etching or removal, patterning, and doping, which can build an electronic device on each die in a semiconductor wafer.

The manufacturing stage 310 can include the manufacturing equipment 313 to implement several different manufacturing phases, such as in-circuit testing, die cutting, wire bonding, device packaging, burn-in testing, device binning, device marking, or the like, the outcome of which produces an secured integrated circuit device 321 available for distribution. The in-circuit testing phase, for example, performed by Automatic Test Equipment (ATE) or the like, can implement the secure test program 306 to detect electrical defects in particular dies and optionally may be able to log diagnostic information about the detected defects that may be used to locate a source of a defect. The die cutting and wafer bonding phases can cut the wafer into individual die and attach bond wire to each of die having passed the in-circuit testing. The device packaging phase can encase the die implementing the electronic device into a supporting case or assembly, which forms the secured integrated circuit device 321. The burn-in testing phase can exercise or stress the functionality of the components in the fabricated electronic device, for example, by forcing failures under supervised conditions. The device binning phase can allow the manufacturer to categorize integrated circuit devices according to their capabilities determined by the burn-in testing. The device marking phase can affix or ascribe physical marking corresponding to the categorization assigned during the device binning phase. In some embodiments, the physical marking can be adding paint or dye to the secured integrated circuit device 321, or etching the integrated circuit, for example, through a laser etching process.

As will be discussed below in greater detail, the integrated circuits fabricated by the fabrication equipment 312 based on the secure circuit design 304 can be locked or disabled, for example, by security circuitry in the integrated circuits. The security circuitry in the integrated circuits can correspond to the security design 302 integrated into the secure circuit design 304 by the design automation tool(s) 303.

The manufacturing equipment 313 can facilitate secured provisioning 314 of the integrated circuits. For example, the manufacturing equipment 313 can provide one or more messages to the integrated circuits, which can allow the security circuitry in the integrated circuits to temporarily unlock or enable portions of their active circuitry. The one or more messages may be embedded in test patterns generated via execution of the secure test program 306, which the security circuitry in the integrated circuits can extract and utilize to perform the secured provisioning 314 of its active circuitry. In some embodiments, the messages generated via execution of the secure test program 306 can be encrypted or obfuscated in the test patterns, which the security circuitry in the integrated circuits can be configured to decrypt or de-obfuscate. Embodiments of secured provisioning with the security circuitry will be described below in greater detail.

Figure 4:
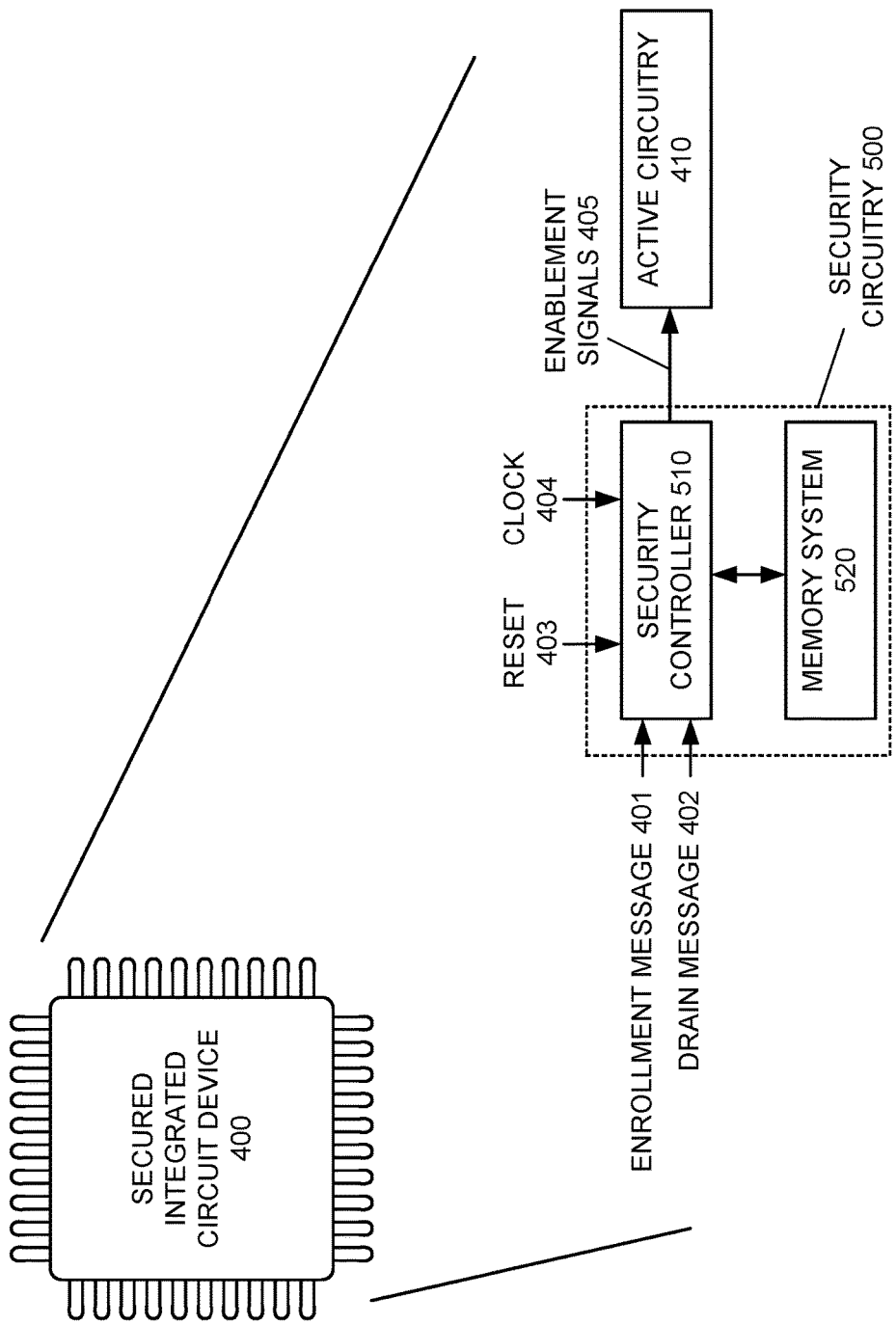
FIG. 4 illustrates an example secured integrated circuit device including security circuitry for rationed enablement according to various examples of the invention.

FIG. 4 illustrates an example secured integrated circuit device 400 including security circuitry 500 for rationed enablement according to various examples of the invention. Referring to FIG. 4, the secured integrated circuit device 400 can be manufactured according to a circuit design, and optionally packaged into a supporting case or assembly. The secured integrated circuit device 400 can include active circuitry 410 to perform the functionality described in the circuit design, and include security circuitry 500 configured to perform rationed enablement of the active circuitry 410. For example, the active circuitry 410 can include registers or other logic to enable or disable portions of the active circuitry 410 based on enablement signals 405 generated by the security circuitry 500. In some embodiments, the active circuitry 410 can be enabled or disabled by activating or deactivating a reset signal in the active circuitry 410, altering power provided to portions of the active circuitry 410, altering a clock signal provided to the active circuitry 410, altering data paths in the active circuitry 410, or the like.

The security circuitry 500 can enroll the secured integrated circuit device 400 for rationed enablement of the active circuitry 410. The enrollment process can include configuring the security circuitry 500 to generate the enablement signals 405, configuring the security circuitry 500 to detect enablement events capable of prompting the security circuitry 500 to generate the enablement signals 405, setting a number of detected enablement events that the security circuitry 500 can respond to by generating the enablement signals 405, a combination thereof, or the like.

The security circuitry 500 can perform enrollment based, at least in part, on an enrollment message 401, for example, received in a test pattern generated by testing equipment in response to execution of a secure test program. The security circuitry 500 can include a security controller 510 to utilize the enrollment message 401 to configure a memory system 520 in the security circuitry 500. The security controller 510 can utilize the configuration of the memory system 520 to determine when and how to generate and/or output the enablement signals 405. In some embodiments, the memory system 520 can be configured without receiving the enrollment message 401, for example, the memory system 520 can be configured during manufacture, configured automatically by the security controller 510 without receiving any messages, or the like.

After enrollment, the security circuitry 500 can perform rationed enablement of the active circuitry 410 in the secured integrated circuit device 400. The security circuitry 500 can detect one or more enablement events, which can prompt the security controller 510 to utilize the configuration of the memory system 520 to determine whether to generate or change a state of the enablement signals 405. These enablement events can include a toggle or state change of a reset signal 403, lapsing of a period of time, for example, measured based on a clock signal 404, during which the active circuitry 410 is enabled, or the like. The security controller 510 may receive the reset signal 403 from an external pin of the secured integrated circuit device 400, other circuitry in the secured integrated circuit device 400, or the like. The security controller 510 may receive the clock signal 404 from a clock generation circuitry in the secured integrated circuit device 400, an external pin of the secured integrated circuit device 400, or the like.

The security controller 510 also can receive a drain message 402, for example, in a test pattern generated by testing equipment in response to execution of the secure test program. The security controller 510, based on the drain message 402, can reconfigure the memory system 520, which can eliminate the ability of the security controller 510 to perform rationed enablement. For example, based on the drain message 402, the security controller 510 can be configured to no longer detect enablement events, no longer respond to one or more detected enablement events by changing a state of the enablement signals 405, no longer generate the enablement signals 405 with a state that can enable the active circuitry 410, a combination thereof, or the like.

Figure 5:
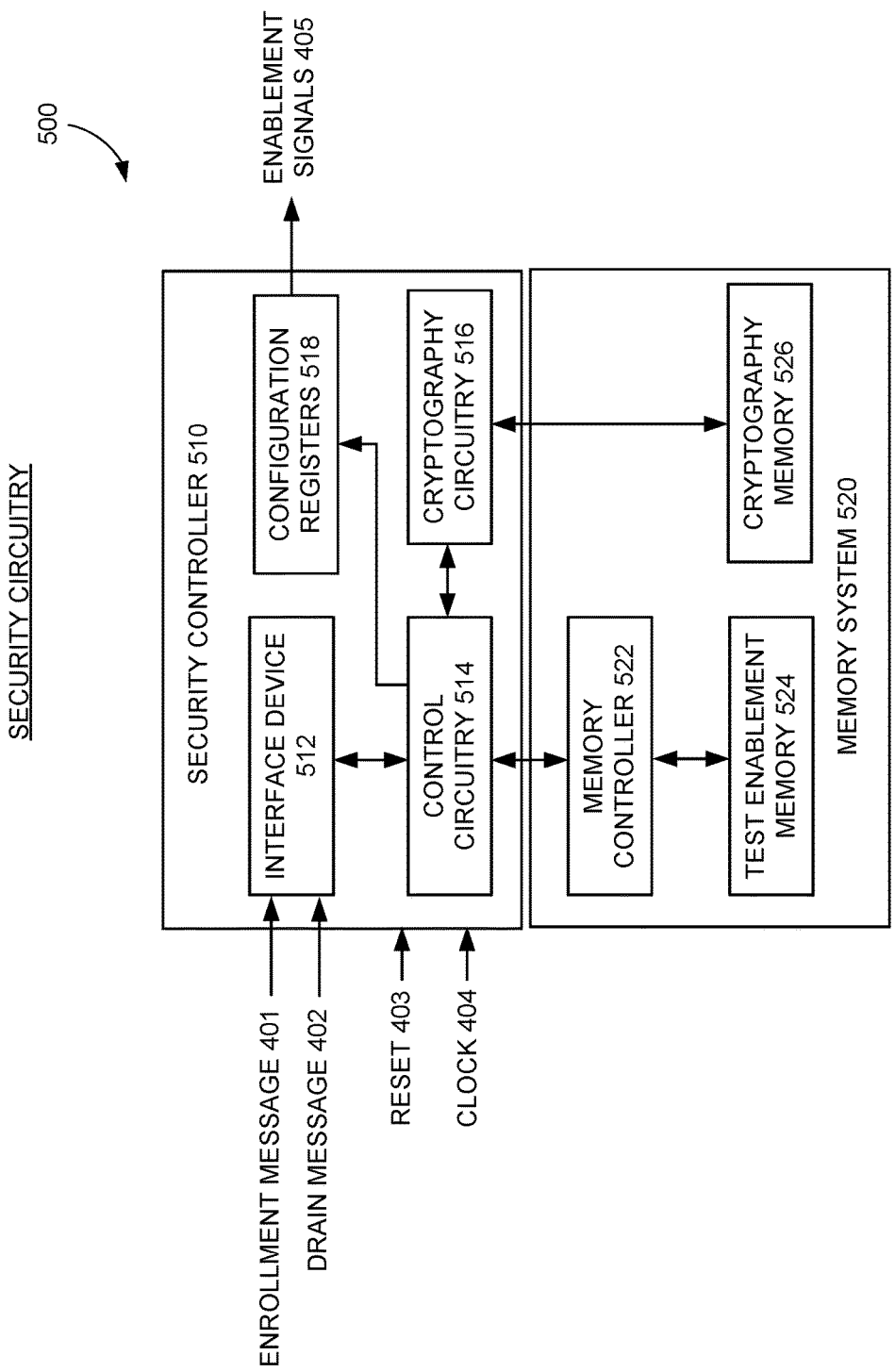
FIG. 5 illustrates an example implementation of the security circuitry described in FIG. 4.

FIG. 5 illustrates an example implementation of the security circuitry 500 described in FIG. 4. Referring to FIG. 5, the security circuitry 500 can include an interface device 512 to receive messages, such as an enrollment message 401 and/or a drain message 402, in a test pattern from testing equipment. In some embodiments, the interface device 512 can communicate with the testing equipment or the like via a local connection, for example, utilizing a Joint Test Action Group (JTAG) protocol codified by one or more of Institute of Electrical and Electronics Engineers (IEEE) Standards 1149.1 or 1149.7. The interface device 512, in some examples, can extract the messages from the test pattern and forward them to control circuitry 514 in the security controller 510.

When the messages, such as the enrollment message 401 and/or the drain message 402, are encrypted or obfuscated in the test pattern, the control circuitry 514 and/or cryptography circuitry 516 can decrypt, deobfuscate, or the like, the messages in the test pattern. The cryptography circuitry 516, in some embodiments, can access a cryptography memory 526 of the memory system 520 to perform decryption, deobfuscation, or the like, of the message.

The cryptography circuitry 516 also can generate message authentication codes (MAC) from received messages, which the control circuitry 514 can compare against message authentication codes in received messages themselves. The control circuitry 514 can analyze the comparison of message authentication codes to detect accidental and intentional changes to the messages and also possibly confirm an origin of the messages. These message authentication codes can be a hash-based message authentication code (HMAC), a cipher-based message authentication code (CMAC), or the like.

The control circuitry 514 also can perform enrollment or drain operations based on the contents of the messages received from the interface device 512. For example, when the control circuitry 514 receives the enrollment message 401 from the interface device 512, the control circuitry 514 can direct a memory controller 522 in the memory system 520 to configure a test enablement memory 524 based, at least in part, on contents of the enrollment message 401. As will be discussed below in greater detail, in some examples, the enrollment message 401 can include a key code, an enablement quantity, and a delta value as well as the aforementioned message authentication code. The control circuitry 514 can store information corresponding to the key code, the enablement quantity, and the delta value in the test enablement memory 524.

In some embodiments, the test enablement memory 524 can be a one-time programmable (OTP) memory, or the like, where each bit in the memory starts in an initial state and can be irreversibly programmed or set by the memory controller 522 to a different state. The control circuitry 514 can configure the test enablement memory 524 by programming the test enablement memory 524 to include or represent the key code, the enablement quantity, the delta value, or the like. The key code can correspond to a value the security controller 510 can utilize to generate enablement signals 405. In some embodiments, the key code can be encrypted or obfuscated in the test enablement memory 524, which the control circuitry 514 and/or the cryptography circuitry 516 can decrypt or de-obfuscate.

In some embodiments, the test enablement memory 524 can include a section of memory, such that each bit in its initial state corresponds to a potential enablement event that the security controller 510 can respond to by generating enablement signals 405. The control circuitry 514 can utilize the enablement quantity in the enrollment message 401 to configure the section of the test enablement memory 524 to include a number of bits in the initial state corresponding to a number identified in the enablement quantity. For example, if the section of the test enablement memory 524 can store 100 bit values and the enrollment message 401 includes an enablement quantity corresponding to 70, the control circuitry 514 can prompt the memory controller 522 to program 30 bit values in the section of the test enablement memory 524, leaving 70 in their initial state.

After enrollment, the security controller 510 can output the enablement signals 405 to the active circuitry. In some embodiments, the control circuitry 514 can set configuration registers 518 in the security controller 510, and the configuration registers 518, based on a state or settings of its registers, can output the enablement signals 405 capable of disabling or enabling the active circuitry or portions thereof. The control circuitry 514 can utilize the key code stored in the test enablement memory 524 to set the configuration registers 518 with a state or setting capable of enabling the active circuitry or portions thereof. The key code can have a bit pattern that can be provided to the configuration registers 518 as a setting, or control circuitry 514 can utilize the key code to generate a setting for the configuration registers 518. In other embodiments, the control circuitry 514 can utilize a disablement value stored in the test enablement memory 524 to set the configuration registers 518 with a state or setting capable of disabling the active circuitry or portions thereof.

The control circuitry 514 can set the configuration registers 518 with a state or setting capable of enabling the active circuitry, or portions thereof, a limited number of times and/or for a limited duration of time. In some embodiments, the control circuitry 514 can utilize enablement events as triggers to set the configuration registers 518. The enablement events can include a toggle or state change of a reset signal 403, lapsing of a period of time, for example, measured based on a clock signal 404, during which the active circuitry is enabled, or the like. The control circuitry 514 can monitor the reset signal 403, the clock signal 404, the enablement signals 405, the configuration of the test enablement memory 524, or the like, to detect the enablement events. For example, the control circuitry 514 can detect a toggle in the reset signal 403 as an enablement event. In another example, the control circuitry 514 can monitor the clock signal 404 to determine when a period of time—corresponding to the delta in the enrollment message 401—has lapsed.

In response to detecting an enablement event, the control circuitry 514 can utilize the test enablement memory 524 to determine whether the security controller 510 can respond to the detected enablement event by generating enablement signals 405. Since the test enablement memory 524 was configured during enrollment with a finite number of potential enablement events that the security controller 510 could respond to by generating enablement signals 405, the control circuitry 514 can access the test enablement memory 524 to determine whether its configuration indicates a presence of at least one of the potential enablement events. As discussed above, in some embodiments, the test enablement memory 524 can store records of the potential enablement events by leaving memory cells in a predetermined portion of the test enablement memory 524 unset or unprogrammed.

When the control circuitry 514 determines that the test enablement memory 524 includes a record corresponding to at least one potential enablement event, the control circuitry 514 can program one of the memory cells in a predetermined portion of the test enablement memory 524 and set the configuration registers 518 with a state or setting capable of enabling the active circuitry or portions thereof. When the control circuitry 514 determines that the test enablement memory 524 does not include a record corresponding to at least one potential enablement event, the control circuitry 514 can set the configuration registers 518 with a state or setting capable of disabling the active circuitry or portions thereof. In some embodiments, when the control circuitry 514 determines that the test enablement memory 524 does not include a record corresponding to at least one potential enablement event, the control circuitry 514 also may reconfigure the test enablement memory 524 to remove the key code, enablement quantity, delta value, modify a chip state, or the like, which may also be performed in response to receiving a drain message 402 from the interface device 512. For example, when the test enablement memory 524 is a one-time programmable memory, the control circuitry 514 can program one or more of the memory cells in the test enablement memory 524 to remove the key code, enablement quantity, delta value, modify a chip state.

Figure 6:
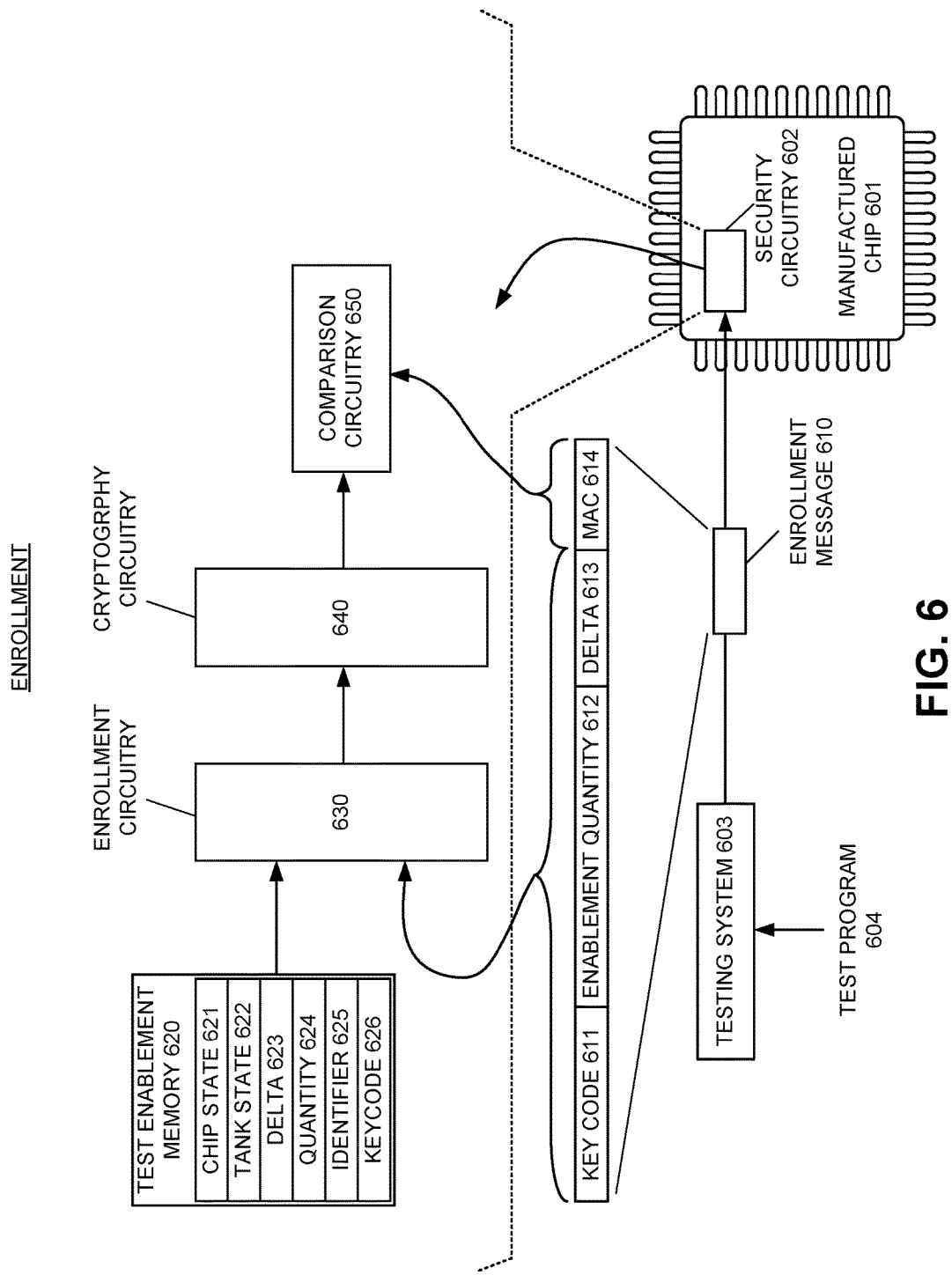
FIGS. 6 and 7 illustrate example enrollment of a manufactured chip for rationed enablement according to various embodiments of the invention.
Figure 7:
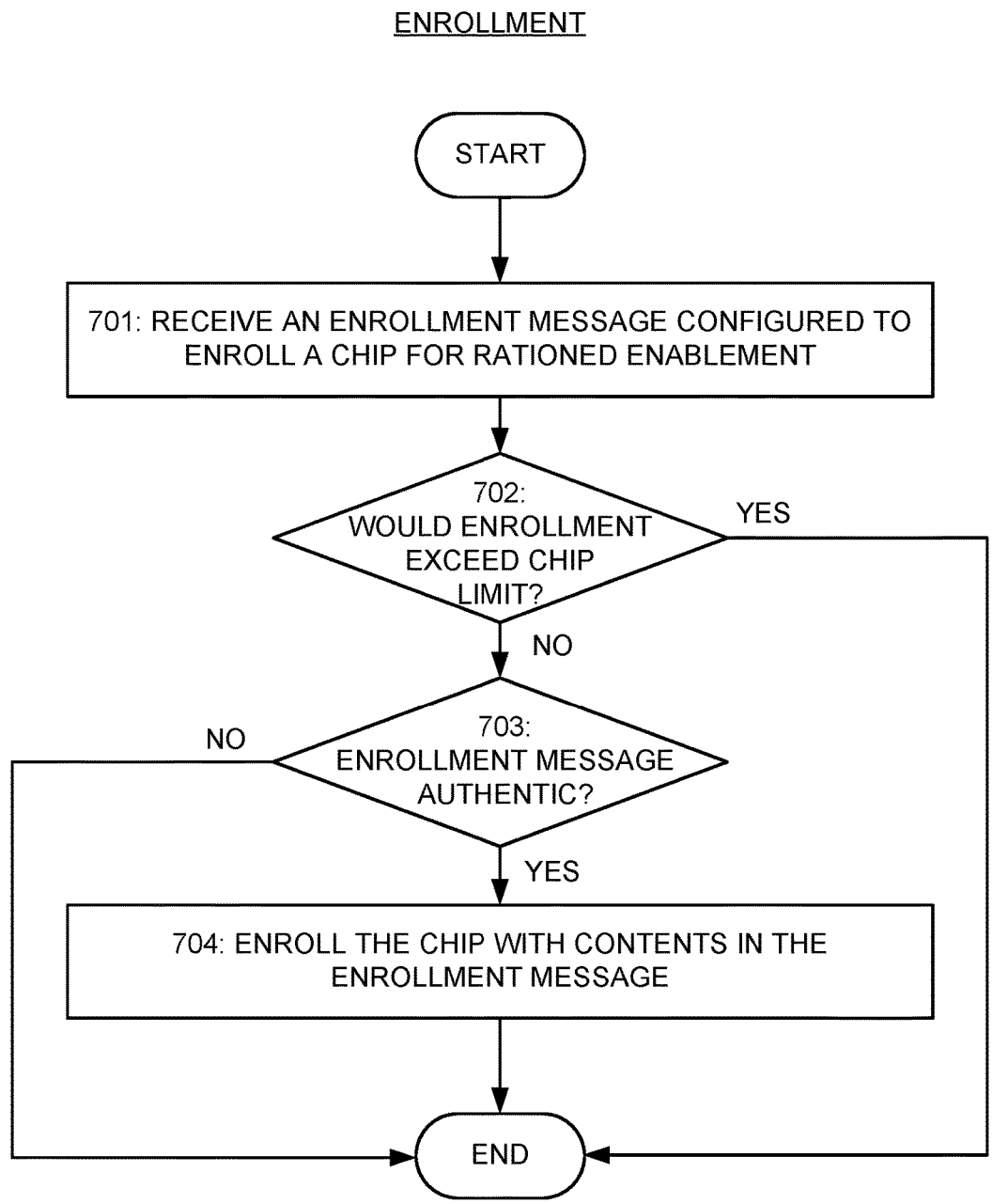

FIGS. 6 and 7 illustrate example enrollment of a manufactured chip 601 for rationed enablement according to various embodiments of the invention. Referring to FIG. 6, the manufactured chip 601 can receive an enrollment message 610 from a testing system 603. In some embodiments, the enrollment message 610 can be integrated into a test pattern or test message that the testing system 603 generated in response to execution of a test program 604. In some embodiments, some equipment in the testing system 603 can be implemented in a computing environment, for example, as described above in FIGS. 1 and 2.

The manufactured chip 601 can include security circuitry 602 to extract the enrollment message 610 from the test pattern, for example, decrypting or deobfuscating the enrollment message 610 in the process. The enrollment messages 610 can include multiple fields, such as a key code 611, an enablement quantity 612, a delta value 613, a message authentication code 614, or the like. The key code 611 can identify a state or setting capable of enabling the active circuitry or portions thereof. The enablement quantity 612 can identify a ration value or a number of times the security circuitry 602 can utilize the key code 611 to generate signaling with the state capable of enabling the active circuitry or portions thereof. The delta value 613 or time quota can correspond to a time period or other resource measurement for the manufactured chip 601, such as chip restarts, a power consumption measurement, an operating temperature measurement, a chip aging effect measurement, a memory access counter, a processor event counter, or the like. The security circuitry 602 can utilize the delta value 613 to determine when to consume a ration defined by the enablement quantity 612. The security circuitry 602 can utilize the delta value 613 while the security circuitry 602 is outputting the signaling with the state capable of enabling the active circuitry or portions thereof. The message authentication code 614 can correspond to a value generated from at least a portion of the enrollment message 610 prior to transmission of the enrollment message 610 to the security circuitry 602. In some embodiments, the message authentication code 614 can be a hash-based message authentication code (HMAC), a cipher-based message authentication code (CMAC), or the like.

The security circuitry 602 can utilize the enrollment message 610 to populate portions of a test enablement memory 620 included in the security circuitry 602. Prior to populating the test enablement memory 620, the security circuitry 610 can analyze the enrollment message 610 and/or the test enablement memory 620 to determine whether to utilize the enrollment message 610 to populate the test enablement memory 620.

The security circuitry 602 can include enrollment circuitry 630 to determine whether the test enablement memory 620 can be configured by the security circuitry 602 during enrollment. For example, the security circuitry 602 may be configured to allow limited enrollment, such as a one-time enrollment, of the test enablement memory 620. The enrollment circuitry 630 can determine whether the test enablement memory 620 has been previously enrolled, a number of times it has been enrolled, or the like.

If a state of the test enablement memory 620 indicates that a future enrollment of the test enablement memory 620 would exceed the limited enrollment authorized by the security circuitry 602, the enrollment circuitry 630 can take action to ensure the test enablement memory 620 does not become re-enrolled. In some embodiments, the enrollment circuitry 630 can perform at least one logical operation on the enrollment message 610, such as XOR the enrollment message 610 with data stored in the test enablement memory 620. For example, the enrollment circuitry 630 can perform an operation on the key code 611, the enablement quantity 612, and/or the delta value 613 from the enrollment message 610 based on one or more portions of the test enablement memory 620. When the test enablement memory 620 has a state or stored values that do not allow for enrollment or re-enrollment, the enrollment circuitry 630 can alter the key code 611, the enablement quantity 612, and/or the delta value 613. In some embodiments, the enrollment circuitry 630 can alter the message authentication code 614 rather than the key code 611, the enablement quantity 612, and/or the delta value 613, which can cause the security circuitry 602 to ensure the test enablement memory 620 does not become enrolled or re-enrolled in response to the enrollment message 610.

In some embodiments, the test enablement memory 620 can store a chip state 621, a tank state 622, a delta value 623, a quantity 624, an identifier 625, and a key code 626. For example, the chip state 621 can identify whether the manufactured chip 601 has been previously enrolled. The tank state 622 can be a value configured to identify whether the manufactured chip 601 has utilized its rations corresponding to an enablement quantity to enable active circuitry in the manufactured chip 601. If the test enablement memory 620 has been enrolled, the delta value 623, quantity 624, and key code 626 can identify information from the enrollment message utilized during the enrollment, such as the delta value 613, the enablement quantity 612, and the key code 611 from the enrollment message 610. The identifier 625 can be a value configured to distinguish the manufactured chip 601 from other manufactured chips.

The security circuitry 610 can include cryptography circuitry 640 to generate a message authentication code from the output from the enrollment circuitry 630. In some embodiments, the enrollment circuitry 630 can output an unaltered version of the enrollment message 610 to the cryptography circuitry 640. In other embodiments, the enrollment circuitry 630 can output an altered version of the enrollment message 610 to the cryptography circuitry 640, for example, with the message authentication code 614 altered based on the state of the test enablement memory 620.

The security circuitry 610 can include comparison circuitry 650 to compare the message authentication code 614 in the received enrollment message 610 against the message authentication code generated by the cryptography circuitry 640. The security circuitry 602 can analyze the comparison of message authentication codes to detect accidental and intentional changes to the enrollment message 610. When the message authentication codes match, the security circuitry 602 can utilize the enrollment message 610 to enroll the manufactured chip 601, for example, by populating and configuring portions of the test enablement memory 620 based on contents in the enrollment message 610. When the message authentication codes do not match, the security circuitry 602 can elect to not initiate the enrollment process based on the received enrollment message 610.

Referring to FIG. 7, in a block 701, security circuitry in a chip can receive an enrollment message configured to enroll the chip for rationed enablement. In some embodiments, the security circuitry can receive the enrollment message in a test pattern from testing equipment. The security circuitry can communicate with the testing equipment or the like via a local connection, for example, utilizing a Joint Test Action Group (JTAG) protocol codified by one or more of Institute of Electrical and Electronics Engineers (IEEE) Standards 1149.1 or 1149.7. When the enrollment message is encrypted or obfuscated in the test pattern, the security circuitry can decrypt, deobfuscate, or the like, the enrollment message in the test pattern.

In a block 702, the security circuitry can determine whether enrollment of the chip based on the enrollment message, would exceed an enrollment limit for the chip. In some embodiments, the security circuitry can include a memory system capable of storing a chip state, which can indicate whether the chip has been previously enrolled. When the security circuitry allows multiple enrollments of the chip, the chip state in the memory system can identify how many times the chip has been previously enrolled.

When the security circuitry, based on the chip state, determines that enrolling the chip would exceed the enrollment limit for the chip, the security circuitry can end the enrollment process. In some embodiments, the security circuitry can end the enrollment process by altering the enrollment message, for example, by altering the key code, enablement quantity, delta value, and/or the message authentication code in the enrollment message, to ensure that the enrollment message does not pass a subsequent authentication process performed by the security circuitry.

When the security circuitry, based on the chip state, determines that enrolling the chip would not exceed the enrollment limit for the chip, execution can proceed to a block 703, where the security circuitry can determine whether the enrollment message is authentic. The enrollment message can include a message authentication code, such as a hash-based message authentication code (HMAC), a cipher-based message authentication code (CMAC), or the like. The security circuitry can generate a message authentication code from a portion of the enrollment message and compare the generated message authentication code against the message authentication code included in the message to determine whether the enrollment message was accidentally or intentionally altered. When the security circuitry determines the message authentication codes do not match, the security circuitry can end the enrollment process.

When the security circuitry determines the message authentication codes do match, execution can proceed to a block 704, where the security circuitry can enroll the chip with contents in the enrollment message. In some embodiments, the enrollment message can include a key code, an enablement quantity, and a delta value as well as the aforementioned message authentication code. The security circuitry can store information corresponding to the key code, the enablement quantity, and the delta value in the memory system, thus enrolling the security circuitry to perform rationed enablement of active circuitry in the chip.

Figure 8:
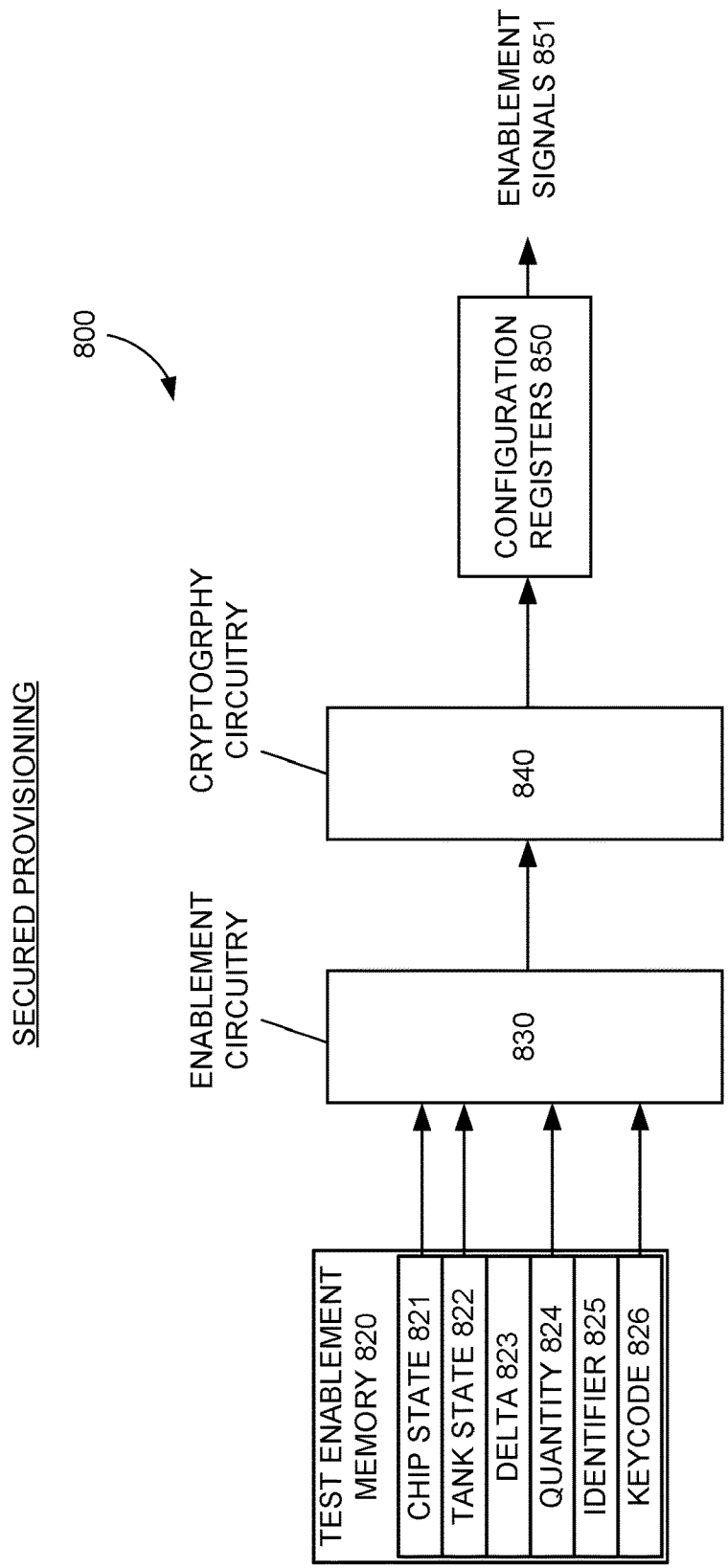
FIGS. 8 and 9 illustrate example rationed enablement of a manufactured chip according to various examples of the invention.
Figure 9:
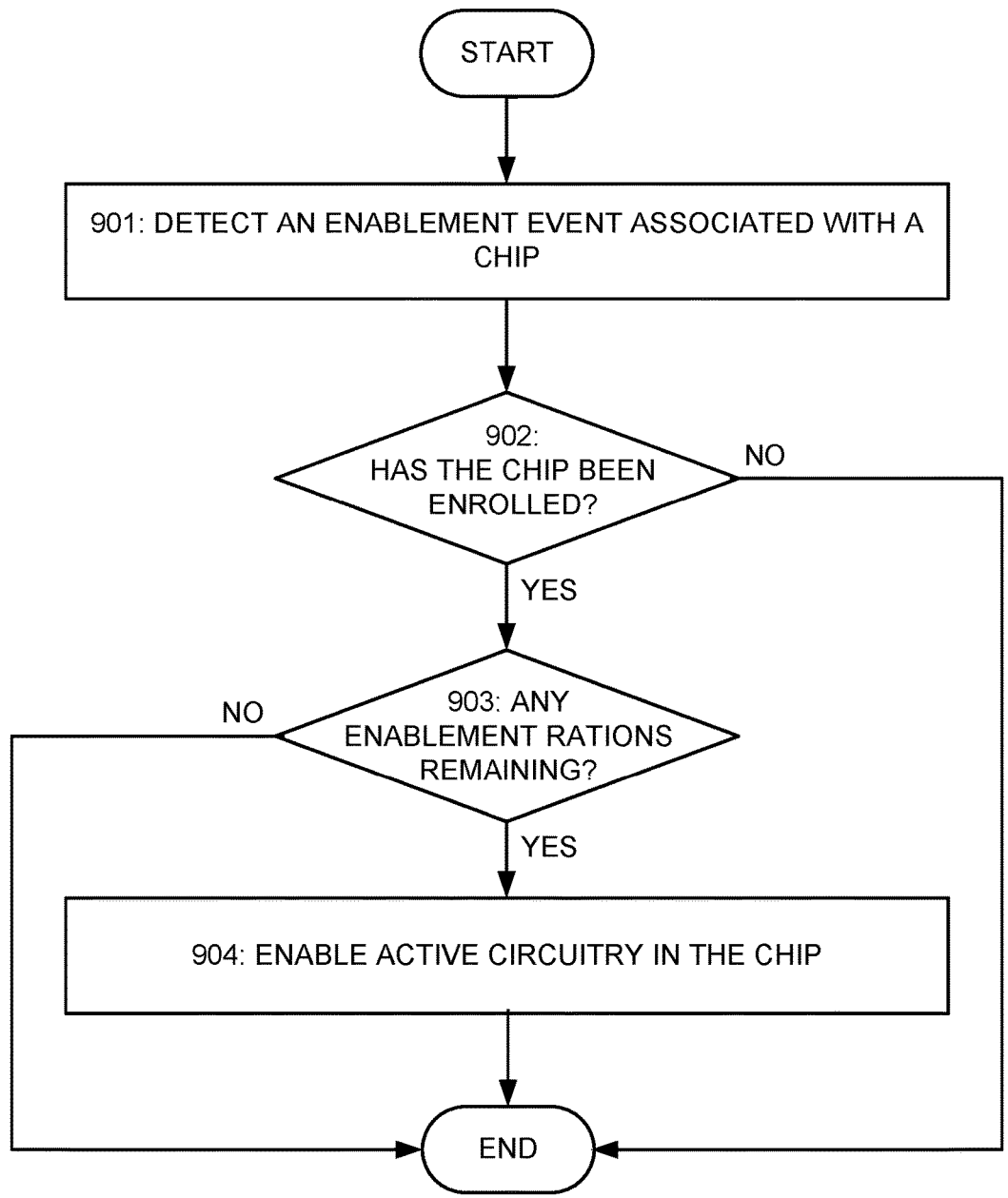

FIGS. 8 and 9 illustrate example rationed enablement of a manufactured chip according to various examples of the invention. Referring to FIG. 8, the manufactured chip can include security circuitry 800 capable of performing rationed enablement of active circuitry in the manufactured chip, for example, in response to detection of an enablement event. The security circuitry 800 can utilize a configuration of a test enablement memory 820 to generate enablement signals 851 that, when provided to the active circuitry in the manufactured chip, can enable or disable the active circuitry.

In some embodiments, the test enablement memory 820 can store a chip state 821, a tank state 822, a delta value 823, a quantity 824, an identifier 825, and a key code 826. For example, the chip state 821 can identify whether a manufactured chip that includes the test enablement memory 820 has been previously enrolled. The tank state 822 can be a value configured to identify whether the manufactured chip has utilized its rations corresponding to an enablement quantity to enable active circuitry in the manufactured chip. If the test enablement memory 820 has been enrolled, the delta value 823, quantity 824, and key code 826 can identify information from the enrollment message utilized during the enrollment. The identifier 825 can be a value configured to distinguish the manufactured chip from other manufactured chips.

The security circuitry 800 can include enablement circuitry 830 to analyze the test enablement memory 820 to determine whether the test enablement memory 820 has additional rations that the security circuitry 800 can consume to generate enablement signals 851 capable of enabling the active circuitry. For example, the enablement circuitry 830 can utilize the chip state 821 to determine whether the manufacture chip was enrolled, utilize the tank state 822 to determine whether the test enablement memory 820 includes any available rations, and/or utilize the quantity 824 to determine a number of available rations are available. When the manufactured chip was enrolled and still includes available rations, the enablement circuitry 830 can output a value based, at least in part, on the key code 826. In some embodiments, the enablement circuitry 830 can derive the value utilizing the key code 826 and possibly other data stored in the test enablement memory 820. For example, the key code 826 in the test enablement memory 820 can be cipher text, and the enablement circuitry 830 can utilize the cipher text to derive the output value.

The security circuitry 800 can include cryptography circuitry 840 to decrypt the output value from the enablement circuitry 830, for example, to generate a setting for configuration registers 850. The cryptography circuitry 840 can load the setting into the configuration registers 850, which the configuration registers 850 can utilize to generate the enablement signals 851.

Referring to FIG. 9, in a block 901, security circuitry in a chip can detect an enablement event associated with the chip. In some embodiments, the security circuitry can monitor a reset signal of the chip, a clock signal for the chip, or the like to detect the enablement event. For example, the security circuitry can detect a toggle in the reset signal as an enablement event. In another example, while the security circuitry has been enabling active circuitry in the chip, the security circuitry can monitor the clock signal to detect an enablement event when a period of time has lapsed. In some embodiments, the security circuitry can monitor power cycles, monitor an age of the chip, monitor memory accesses, or the like, to detect an enablement event.

In a block 902, the security circuitry can determine whether the chip has been previously enrolled for rationed enablement. In some embodiments, the security circuitry can include a memory system capable of being configured for rationed enablement during enrollment. The memory system can include data corresponding to a chip state, which can identify whether the chip has been enrolled or not. The security circuitry can read the chip state from the memory system to determine whether the chip has been previously enrolled for rationed enablement. When the chip has not been enrolled for rationed enablement, the security circuitry can end a rationed enablement process.

When the chip has been enrolled for rationed enablement, execution can proceed to a block 903, where the security circuitry can determine whether the chip has any enablement rations remaining from the enrollment. The enrollment of the chip for rationed enablement can configure the security circuitry with an authorized number of times that the security circuitry can enable active circuitry in the chip. After each time the security circuitry determines to enable the active circuitry via the enablement process, the security circuitry can decrement the authorized number or otherwise consume a ration available to the security circuitry. In some embodiments, the memory system in the security circuitry can include a section of memory, such that each bit in its initial state can correspond to a different enablement ration. During enrollment, the memory system can be configured to leave the authorized number of bits in their initial state. The security circuitry, after determining to enable the active circuitry, can program one of the bits into a new state, which can consume one enablement ration.

In a block 904, the security circuitry can enable active circuitry in the chip, for example, by outputting enablement signals having a state capable of enabling the active circuitry in the chip. In some embodiments, the security circuitry can utilize a key code stored in the memory system during enrollment to generate a setting for configuration registers in the security circuitry. The configuration registers can utilize the setting to set a state of the enablement signals provided to the active circuitry.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, NVRAM, OTP, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to certain processes, it should be appreciated that various examples of the invention may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
configuring security circuitry of an electronic system to enable active circuitry in the electronic system for an authorized number of times based on a key code in an enrollment message received by the security circuitry, wherein the enrollment message includes an enablement quantity configured to identify the authorized number of times the security circuitry is capable of enabling the active circuitry in the electronic system;
detecting, by the security circuitry, an enablement event associated with the electronic system;
in response to the detection of the enablement event, determining, by the security circuitry, a number of times the security circuitry has previously enabled the active circuitry; and
generating, by the security circuitry, enablement signals when the determined number of times the security circuitry has previously enabled the active circuitry is fewer than the authorized number of times, wherein the active circuitry is configured to be enabled to perform operations in response to the enablement signals from the security circuitry.

2. The method of claim 1, further comprises loading, by the security circuitry, configuration registers in the security circuitry with a setting, and wherein the configuration registers, based on the setting, are configured to output the enablement signals capable of enabling the active circuitry in the electronic system.

3. The method of claim 1, wherein configuring the security circuitry further comprises selectively populating a memory system in the security circuitry with contents of the enrollment message based, at least in part, on a state of the electronic system stored in the memory system.

4. The method of claim 1, further comprising extracting, by the security circuitry, the enrollment message from a test pattern provided to the electronic system by testing equipment.

5. The method of claim 1, wherein the enrollment message includes a time quota, and wherein the enablement event corresponds to at least one of a reception of a reset signal associated with the electronic system or a lapse of a time period corresponding to the time quota.

6. The method of claim 1, further comprising: receiving, by the security circuitry, a drain message; and
reconfiguring, by the security circuitry, to remove an ability to enable the active circuitry in the electronic system based on the drain message.

7. An electronic system comprising:
active circuitry configured to be selectively enabled an authorized number of times;
security circuitry configured to detect an enablement event associated with the electronic system, determine a number of times the security circuitry has enabled the active circuitry in response to the detection of the enablement event, and generate enablement signals capable of enabling the active circuitry to perform operations when the determined number of times the security circuitry has previously enabled the active circuitry is fewer than the authorized number of times; and
an interface device configured to receive an enrollment message including a key code and an enablement quantity configured to identify the number of times the security circuitry is capable of enabling the active circuitry in the electronic system, wherein the security circuitry is configured to enable the active circuitry based on the key code.

8. The electronic system of claim 7, wherein the security circuitry comprises: configuration registers configured to output the enablement signals having a state based on an internal setting; and control circuitry configured to load the configuration registers with a value that configures the configuration registers with the internal setting.

9. The electronic system of claim 7, wherein the security circuitry comprises a memory system configured to store a state of the electronic system, wherein the security circuitry is configured to selectively populate the memory system with contents of the enrollment message based, at least in part, on the stored state of the electronic system.

10. The electronic system of claim 7, wherein the security circuitry is configured to extract the enrollment message from a test pattern provided to the electronic system by testing equipment.

11. The electronic system of claim 7, wherein the enrollment message includes a delta, and wherein the enablement event corresponds to at least one of a reception of a reset signal associated with the electronic system or a lapse of the time period corresponding to the delta.

12. The electronic system of claim 7, wherein the interface device is configured to receive a drain message, and wherein the security circuitry, based on the drain message, is configured to reconfigure the memory system to remove an ability to generate enablement signals having the state capable of enabling the active circuitry.

13. A device comprising:
- a memory system configured to store information capable of being utilized to enable active circuitry in the electronic system an authorized number of times;
- control circuitry configured to detect an enablement event associated with an electronic system and, in response to the detection of the enablement event, determine a number of times the active circuitry has been previously enabled and selectively enable the active circuitry to perform operations when the determined number of times the active circuitry has been previously enabled is fewer than the authorized number of times; and
- an interface device configured to receive an enrollment message including a key code and an enablement quantity configured to identify the authorized number of times the control circuitry is capable of enabling the active circuitry, wherein the control circuitry is configured to prompt enablement of the active circuitry based on the key code.

14. The device of claim 13, further comprising configuration registers configured to output enablement signals having a state based on an internal setting, wherein the control circuitry is configured to, in response to the detection of the enablement event, load the configuration registers with a value that configures the configuration registers with the internal setting.

15. The device of claim 13, wherein the memory system is configured to store a state of the electronic system, wherein the control circuitry is configured to selectively populate the memory system with contents of the enrollment message based, at least in part, on the stored state of the electronic system.

16. The device of claim 13, wherein the enrollment message further includes a delta, and wherein the enablement event corresponds to at least one of a reception of a reset signal associated with the electronic system or a lapse of the time period corresponding to the delta.

17. The device of claim 13, wherein the control circuitry is configured to extract the enrollment message from a test pattern provided to the electronic system by testing equipment.

* * * * *